(12) United States Patent
Henderson et al.

(10) Patent No.: US 11,619,448 B2
(45) Date of Patent: Apr. 4, 2023

(54) SCRAP SUBMERGENCE DEVICE

(71) Applicant: PYROTEK INC., Spokane, WA (US)

(72) Inventors: Richard S. Henderson, Solon, OH (US); Chris T. Vild, Chagrin Falls, OH (US); Jason Tetkoskie, Cleveland Heights, OH (US)

(73) Assignee: Pyrotek, Inc., Spokane, WA (US)

( * ) Notice: Subject to any disclaimer, the term of this patent is extended or adjusted under 35 U.S.C. 154(b) by 1042 days.

(21) Appl. No.: 16/329,072

(22) PCT Filed: Aug. 29, 2017

(86) PCT No.: PCT/US2017/049029
§ 371 (c)(1),
(2) Date: Feb. 27, 2019

(87) PCT Pub. No.: WO2018/044842
PCT Pub. Date: Mar. 8, 2018

(65) Prior Publication Data
US 2019/0226764 A1    Jul. 25, 2019

Related U.S. Application Data

(60) Provisional application No. 62/488,235, filed on Apr. 21, 2017, provisional application No. 62/380,582, filed on Aug. 29, 2016.

(51) Int. Cl.
*F27B 14/10* (2006.01)
*F27D 5/00* (2006.01)
(Continued)

(52) U.S. Cl.
CPC ............... *F27B 14/10* (2013.01); *F27B 3/02* (2013.01); *F27B 3/12* (2013.01); *F27B 7/2083* (2013.01);
(Continued)

(58) Field of Classification Search
CPC .......... F27B 14/10; F27B 7/2083; F27B 3/02; F27B 3/12; F27D 27/00; F27D 27/005
See application file for complete search history.

(56) References Cited

U.S. PATENT DOCUMENTS

| 3,873,305 A | 3/1975 | Claxton et al. |
| 3,955,970 A | 5/1976 | Claxton et al. |

(Continued)

FOREIGN PATENT DOCUMENTS

EP    2729748 B1    12/2018

OTHER PUBLICATIONS

International Search Report for PCT/US2017/049029, dated Dec. 13, 2017, 14 pages.

*Primary Examiner* — Scott R Kastler
(74) *Attorney, Agent, or Firm* — Lippes Mathias LLP

(57) ABSTRACT

A molten metal scrap submergence system comprising a furnace and a vortexing scrap submergence well. The vortexing scrap submergence well includes a diverter suspended above the well and oriented for immersion in a bath of molten metal circulating within the well. The system, or an alternative scrap submergence system, can include a hood element disposed in an overlapping position with regard to a top opening of the scrap submergence well. The hood at least substantially seals the top opening. The hood element includes a scrap piece feed chute and a burner allowing carbon containing vapor evaporated from the surface of the molten scrap pieces to combust and form predominantly water. The system, or an alternative scrap submergence system can include internal side walls of the well with a first diameter portion adjacent and above said ramp and a second, larger diameter portion above said first portion.

14 Claims, 8 Drawing Sheets

(51) Int. Cl.
 *F27B 3/02* (2006.01)
 *F27B 3/12* (2006.01)
 *F27D 27/00* (2010.01)
 *F27B 14/08* (2006.01)
 *F27B 7/20* (2006.01)

(52) U.S. Cl.
 CPC ............... *F27B 14/08* (2013.01); *F27D 5/00* (2013.01); *F27D 27/00* (2013.01); *F27D 27/005* (2013.01)

(56) References Cited

U.S. PATENT DOCUMENTS

| | | |
|---|---|---|
| 3,984,234 A | 10/1976 | Claxton et al. |
| 3,997,336 A | 12/1976 | van Linden et al. |
| 4,021,192 A | 5/1977 | Ferguson et al. |
| 4,286,985 A | 9/1981 | van Linden et al. |
| 4,598,899 A | 7/1986 | Cooper |
| 4,930,986 A | 6/1990 | Cooper |
| 5,513,207 A * | 4/1996 | Kavia .................... F27B 3/045 373/79 |
| 6,036,745 A | 3/2000 | Gilbert et al. |
| 6,217,823 B1 | 4/2001 | Vild et al. |
| 6,443,220 B1 | 9/2002 | Hohenbichler et al. |
| 7,479,250 B1 | 1/2009 | Areaux et al. |
| 8,449,814 B2 | 5/2013 | Cooper |
| 2003/0197313 A1 | 10/2003 | Areaux et al. |
| 2005/0017417 A1 | 1/2005 | Grayson et al. |
| 2007/0108674 A1 | 5/2007 | Yu et al. |
| 2010/0244338 A1 | 9/2010 | Takahashi |
| 2015/0102536 A1 | 4/2015 | Vild et al. |
| 2019/0226764 A1 * | 7/2019 | Henderson .............. F27B 14/10 |

* cited by examiner

| HEIGHT | |
|---|---|
| 0° | 20.70" |
| 15° | 20.11" |
| 30° | 19.52" |
| 45° | 18.92" |
| 60° | 18.33" |
| 75° | 17.74" |
| 90° | 17.15" |
| 105° | 16.56" |
| 120° | 15.96" |
| 135° | 15.37" |
| 150° | 14.78" |
| 165° | 14.19" |
| 180° | 17.15" |
| 195° | 13.00" |
| 210° | 12.41" |
| 225° | 11.82" |
| 240° | 11.23" |
| 255° | 10.63" |
| 270° | 10.04" |
| 285° | 9.45" |

SCRAP SUBMERGENCE DEVICE

This application claims the benefit of U.S. Provisional Application No. 62/380,582, filed Aug. 29, 2016 and U.S. Provisional Application No. 62/488,235, filed Apr. 21, 2017, the disclosures of each being herein incorporated by reference.

BACKGROUND

The present exemplary embodiment relates to a scrap submergence device. The technology of the present disclosure relates generally to melting pieces of metal and, more particularly, to a reverbatory furnace system for melting light gauge metal stock. As used herein, the term "metal" means any metal or combination of metals, such as aluminum, copper, iron, zinc, magnesium and alloys thereof.

The production, processing, and recycling of metals, such as aluminum, commonly requires melting metal stock, such as scrap stock, that has a high surface area to weight ratio (also referred to as light gauge stock). Examples of such material include scalper chips generated from milling rolling ingots, turnings or swarf from lathe or sawing operations, and output from crushers or shredders used to recycle aluminum sheet, extrusions, or cast shapes. The material is typically melted in a melting chamber of a melting furnace such as a rotary furnace or a reverb furnace.

Light gauge aluminum scrap is intrinsically difficult to efficiently melt because aluminum and its alloys readily oxidize. The process of oxidation turns the surface from aluminum, a valuable metal, to aluminum oxide, a non-metallic mineral of comparatively lower value. Unprotected aluminum surfaces oxidize rapidly in air, even at ambient temperatures. When exposed to temperatures high enough to melt aluminum, the oxidation process is greatly accelerated. Thus, if aluminum is exposed to air at such temperatures, oxidation can completely consume aluminum having thin cross sections, that is, aluminum with a high surface area to weight ratio. However, melting thin walled scrap pieces is difficult because rapid submerging in molten metal is severely hampered by the fact that thin walled scrap pieces float on molten metal ("floating scrap"). Accordingly, melting typically includes a step of actively submerging the light gauge scrap under the surface of the molten metal.

Various devices have been used to submerge metal scrap in molten metal. Typically, molten metal contained in a hearth is circulated by a pump contained in a pump well. In one design, molten metal is drawn from the hearth by the pump and circulated from the pump well to a scrap charging well, to a dross well and back to the hearth. Scrap metal such as aluminum is added to molten metal in the charge well. Referring to FIG. 1, an aluminum recycling furnace 10 is depicted. Furnace 10 includes a main hearth component 12 which is heated, for example, with gas or oil burners or by any other means known in the art. Adjacent, and in fluid communication with the hearth 12 (typically via submerged archways), is the primary recycling area comprised of a pump well 14, a charge well 16 and a dross well 18. Although not shown, the wall of hearth 12 opens to the pump well 14, the pump well opens to the charge well 16, the charge well opens to the dross well 18, and the dross well opens to the hearth 12 to allow the circulation pattern shown by the arrows. The pump well can include a mechanical molten metal pump of any type known to those skilled in the art. Alternatively, the well and pump can be replaced by an electromagnetic pump, for example. The molten metal pump circulates molten metal from the hearth 12 to the charge well 16 where scrap chips of the metal to be recycled are deposited onto the surface of the melt. Molten metal from the charge well 16 flows into the dross well 18 wherein impurities in the form of dross are skimmed from the surface before the melt flows back into the hearth 12.

A variety of apparatus have been used in the charge well to facilitate the submergence of the scrap metal below the surface of the molten metal bath. Three major types of systems exist.

The first type includes mechanical systems constructed primarily of a rotor which creates a molten metal flow from the top surface. Examples of these devices are shown in U.S. Pat. Nos. 3,873,305; 3,997,336; 4,128,415; 4,930,986; and 8,449,814, herein incorporated by reference. Referring now to FIG. 2, a conventional scrap melter system includes a circulation pump 90 and a scrap melter 92. A vessel 21 containing a molten metal bath 2 is generally divided into three compartments. A first compartment 1 (called a pump well) typically houses the circulation pump 90. A second compartment 3 (called a charge well) typically houses the scrap melter 92. A third compartment 7 (called a dross well) allows dross and oxide from the melting process to be skimmed off the molten metal 2. The circulating molten metal 2 moves between compartment 1, compartment 3, and compartment 7 and is preferably circulated throughout the vessel 21. Scrap S is introduced into compartment 3 and is submerged by the downward draw created by an impeller 94 of the scrap melter 92, which draws the scrap downward into the molten metal bath 2.

The second type of system uses a mechanical device to physically push the scrap below the melt surface (e.g., elephant feet/well-walkers). These systems generally comprise a plurality of vertically moveable "feet" that raise and lower to physically push scrap metal residing on the surface of the molten metal below the surface.

The third type of system relies on the shape of the chamber without rotation of a rotor to create a metal flow which submerges scrap pieces in the charge well. Particularly, the flow of molten metal into the charge well is manipulated in such a manner to achieve a vortex which draws chips from the top surface into the bath. These systems include, for example, U.S. Pat. Nos. 3,955,970; 3,984,234; 4,286,985; 6,036,745; 6,217,823; and US 2015/0102536, each of which is herein incorporated by reference. Referring now to FIG. 3, pump 20 is positioned in pump well 14 and draws molten aluminum from the hearth forcing it into the charge well 16. More particularly, the rotation of impeller 23 draws molten aluminum from the bath 24, into the pump 20 and forces it through outlet 26, up passage 28, and through inlet 30 into the charge well 16. Molten aluminum flows up the ramp 32 within charge well 16, spilling over an inner edge 34 of inner column 35 into cavity 36, and exits through outlet 38. The leading edge 44 of the ramp 32 can be positioned adjacent the inlet 30. The flow of molten metal within charge well 16 forms a vortex shape that effectively submerges metal scrap pieces. This third system can be generally referred to as a vortexer apparatus.

One of the disadvantages of vortexer apparatus in which molten metal is pumped into the charge well from a pump without any movable parts in the charge well, is that the only way to adjust the speed and depth of the vortex is to adjust the speed at which the pump rotates the impeller. This variation of the vortex can be limited by the pumping capacity of the pumps, being either too large or too small to achieve the intended vortex speed and depth. In addition, adjusting the vortex by increasing the speed of rotation of the impeller in the base of a pump is disadvantageous because it requires more energy to operate the pump when an alternative vortex is desired.

A further shortcoming arises from a vortexer that too quickly submerges contaminated metal scrap pieces. Particularly, metal scrap pieces being recycled in a charge well may contain remnants of processing liquids (e.g. cutting oil and/or water) used during the machining of parts. Processing liquids can prove problematic if the scrap pieces are too quickly submerged and transported to a dross well. Moreover, an undesirable amount of dross foam may form in the dross well.

Without being bound by theory, it is believed that the foam is a result of submerging gas from the burning cutting oil and evaporating water of the processing fluids. Moreover, submerged processing fluids may contain $C_xH_x$, $CO_2$ and $H_2O$ which may react with aluminum to form oxides and dross. If foam is not removed regularly, it can solidify due to heat loss in the dross well and become very difficult to handle mechanically.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a method of adjusting a vortex of molten metal is provided. The method operates in a vessel including an interior surface for containing molten metal and an opening for receiving solid metal at an upper end portion of the interior surface. An outlet passageway extends downwardly from the interior surface. A vortex control diverter is provided and can be suspended within the molten metal above the outlet passage. An inlet opening penetrates the interior surface. The method positions the vortex diverter at a desired distance above the outlet passageway. Molten metal enters the vessel inlet opening and forms the vortex in the vessel. Molten metal is moved into the vessel inlet opening by operating a pump. Solid metal is deposited in a region between the diverter and the interior surface.

According to a further embodiment, a molten metal scrap submergence system comprising a furnace and a vortexing scrap submergence well is provided. The vortexing scrap submergence well includes a diverter suspended above the well and oriented for immersion in a bath of molten metal circulating within the well. In certain embodiments the diverter is cylindrical. In certain embodiments the diverter comprises a drum having one or both of an open top end and an open bottom or two closed ends.

According to a third embodiment, a molten metal scrap submergence system comprising a furnace and a scrap submergence well is provided. The system further includes a hood element disposed in an overlapping position with regard to a top opening of the scrap submergence well. The hood at least substantially seals the top opening. The hood element includes a scrap piece feed chute and an igniter allowing carbon containing vapor evaporated from the surface of the molten scrap pieces to combust and form predominantly water.

According to a further embodiment, any of the features of the above embodiments one to three can be used in combination with one another.

BRIEF DESCRIPTION OF THE DRAWINGS

The invention consists in the novel parts, construction, arrangements, combinations and improvements, shown and described. The accompanying drawings, which are incorporated in and constitute a part of the specification illustrate one embodiment of the invention and together with the description, serve to explain the principles of the invention.

DETAILED DESCRIPTION

Reference will now be made in detail to one embodiment of the invention, an example of which is illustrated in the accompanying drawings. While the invention will be described in connection with this embodiment, it will be understood that it is not intended to limit the invention to that embodiment. On the contrary, it is intended to cover all alternatives, modifications, and equivalents as may be included within the spirit and scope of the invention defined by the appended claims.

The present invention is directed to a scrap submergence system of the type typically employed in metal recycling processes, such as, the recycling of aluminum. In the recycling of metals, it is necessary to melt scrap pieces for treatment and processing. A large portion of aluminum scrap pieces are thin walled as a result of the mechanical shaping action from which they are formed, such as, shaving, boring and cold rolling. Melting thin walled scrap pieces is particularly difficult because rapid submerging in molten metal is severely hampered by the fact that thin walled scrap pieces float on molten metal. Melting thin walled scrap pieces is also challenging because many scrap pieces include processing fluids coated thereon. Processing fluids can include hydrocarbons and water, each of which are problematic in molten metal processing. Moreover, each can contribute to the undesirable formation of dross foam.

The charge well of the present disclosure can comprise an open top chamber including walls constructed of a heat resistant material. Graphite and ceramic are good examples of suitable heat resistant materials. The chamber includes an inlet positioned in a side wall or base wall and in fluid communication with the pump well and an outlet in the base wall in fluid communication with the dross well. As used herein, the base (or bottom) wall refers to the lower internal surface forming the chamber. Moreover, it is noted that the "outlet" from the overall insert body illustrated in the accompanying figures is from a side wall of the insert body as a result of the outlet being angled between the bottom outlet from the chamber to the outlet from the overall insert. In short, as used herein, a "bottom outlet" is used in reference to the location the molten metal exits the chamber. Typically, the chamber will include an inner column defining the outlet in the chamber base wall. Generally, the internal form of the chamber can be described as a bottom or low side wall inlet and a bottom outlet with a ramp formed between an inner column and the side wall.

Figure 1:
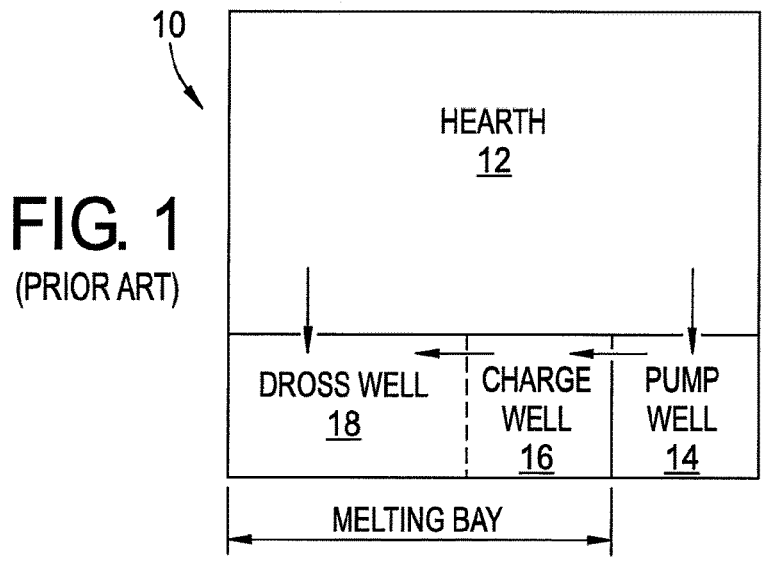
FIG. 1 is a schematic representation of a prior art molten metal recycling furnace.
Figure 2:
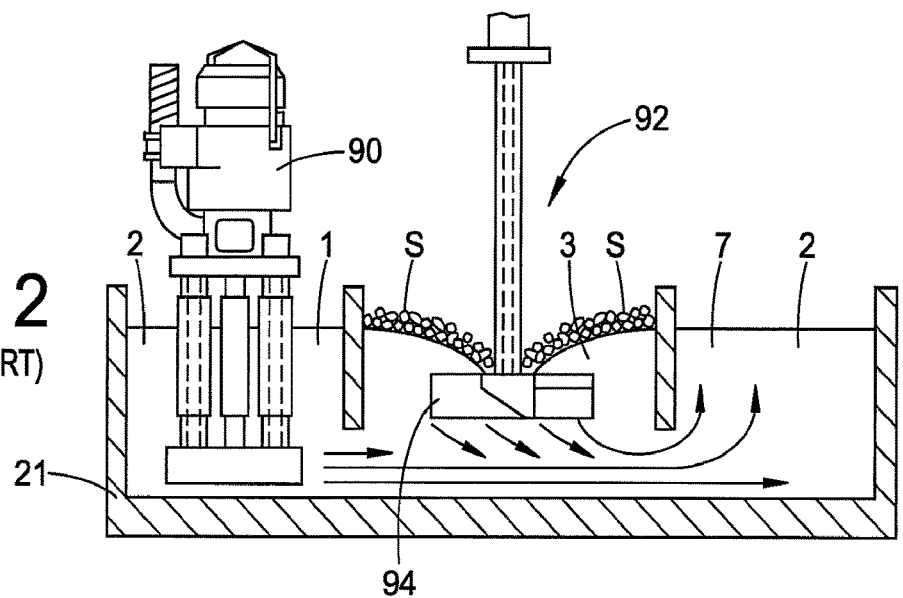
FIG. 2 is a cross-sectional view of a prior art rotor based charge well.
Figure 3:
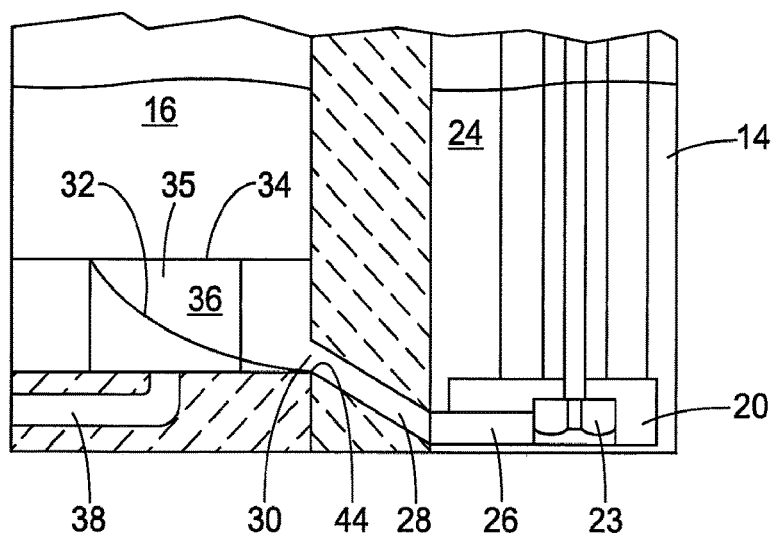
FIG. 3 is a cross-sectional view of a prior art vortexer charge well.
Figure 4:
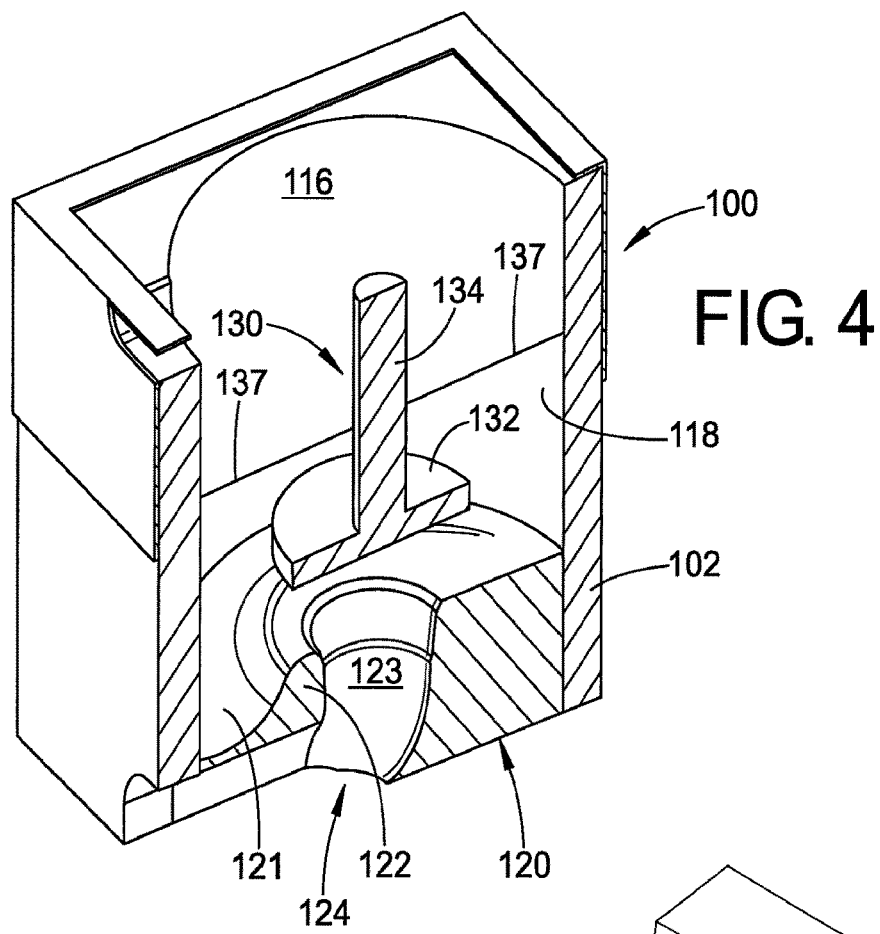
FIG. 4 is a perspective cross-sectional view of a charge well of the present disclosure.

Referring now to a first embodiment of the invention, reference is made to FIG. 4. In this embodiment, a scrap melting device 100 can be comprised of a block of refractory material 102 which can be constructed of a size suited to provide a relatively close tolerance mating with the dimensions of an existing charge well. The block 102 can be constructed of a cured material such as an alumina-silica refractory or other castable refractory material known to those skilled in the art. The surfaces of the cast body can be treated with boron nitride prior to heat treatment.

Block 102 includes a chamber 116 having generally cylindrical side wall 118, a base 120 including ramp 121, and an inner column 122 forming a centrally located cavity 123 leading to outlet 124 and outlet duct (not shown).

A diverter element 130 including a disc 132 and a suspension rod 134 is suspended in the chamber 116. The suspension rod can be anchored to any suitable scaffolding (not shown). The diverter element 130 may similarly be suspended by an apparatus such as a fork lift or other hoist mechanism (see lift 337 in FIG. 7) facilitating adjustment of its position at least vertically and optionally horizontally.

The diverter element 130 can be comprised of a refractory material such as graphite or ceramic. The diverter may further include a densifying material (e.g. lead) cast therein to increase its overall mass and prevent current within the molten metal flowing within the chamber from physically moving the diverter. Alternatively, the diverter element 130 may be permanently affixed to the scrap melting device 100 through projections (e.g. 137) extending from the sidewall 118 and/or inner column 122. These projections would preferably provide only minimal interference with the desired rotational flow of molten metal around the chamber 116 and into the cavity 123.

The diverter 130 can be positioned within the chamber 116 at a position above the cavity 123. Diverter 130 will be suspended at a level below the height of molten metal within the chamber but above a top surface of inner column 122 such that scrap metal pieces floating on the surface of the molten metal are impeded from entering the cavity 123 but are nonetheless able to be eventually expelled to the dross well. In this manner, diverter 130 can be used to slow the submergence of the scrap metal pieces. Slowing submergence provides a corresponding increase of residence time on the surface of the molten metal. This in turn allows for increased evaporation of processing fluids into the atmosphere above the charge well and reduces dross foam formation.

The diverter functions by allowing molten metal scrap to be deposited on the surface of the molten metal bath between the diverter and the interior walls of the chamber. It has been found that the effectiveness of the vortex created in the chamber increases in efficiency as the center of the chamber is approached. In this regard, it has been found that depositing the metal scrap chips between the diverter and the walls of the chamber can slow the egress of the chips from the scrap submergence chamber providing a longer residence time on the surface of the molten metal in the charge well and allowing dampness and processing fluids to be evaporated from the surface of the scrap materials before the scrap materials are submerged into the molten metal. In certain embodiments it may be desirable to provide the diverter disk with holes or passages. Moreover, a perforated diverter (disk or drum) may assist in tailoring a desired molten metal flow rate while still increasing scrap residence time in the charge well.

Figure 5:
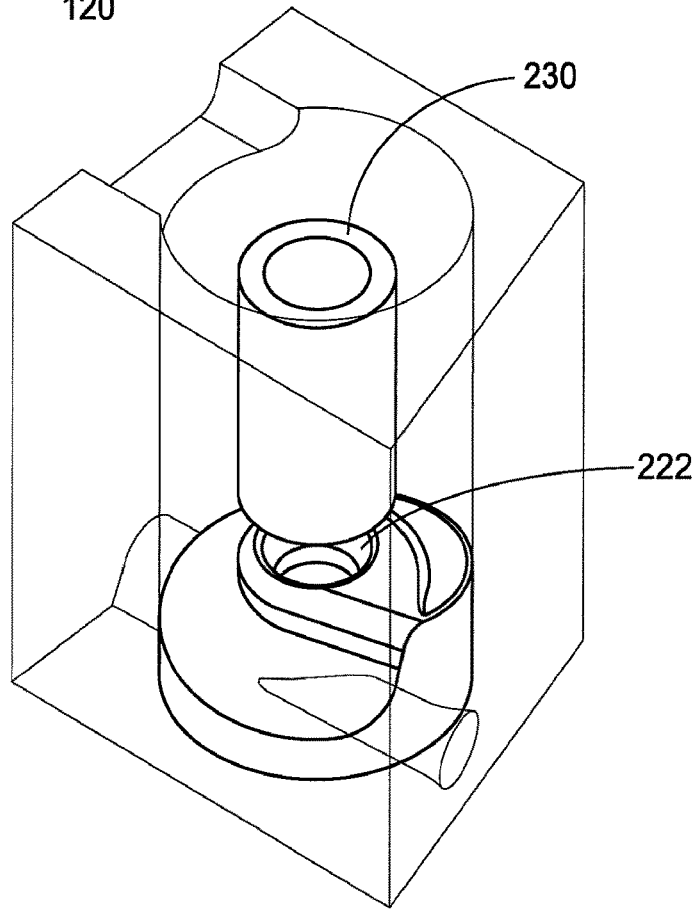
FIG. 5 is a perspective view, partially in phantom, of an alternate charge well.

Turning next to FIG. 5, it is feasible that the diverter 230 can comprise a cylindrical drum body having an open top and an open bottom. Similarly, one or both of the top or bottom surfaces can be wholly or partly sealed. The diverter is preferably constructed to include an outer diameter equal to or larger than the diameter of the opening to the outlet formed by inner column 222. However, it is also envisioned that a diverter even somewhat narrower than the inner column 222 can have a useful effect.

Figure 6:
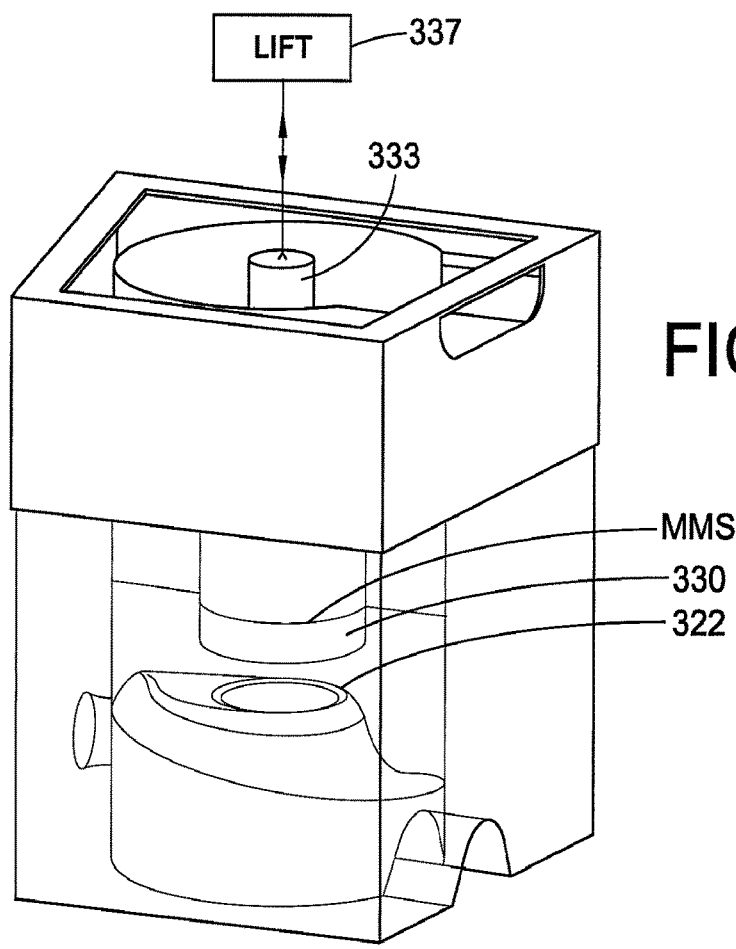
FIG. 6 is a side view, partially in phantom of a further alternate charge well.
Figure 7:
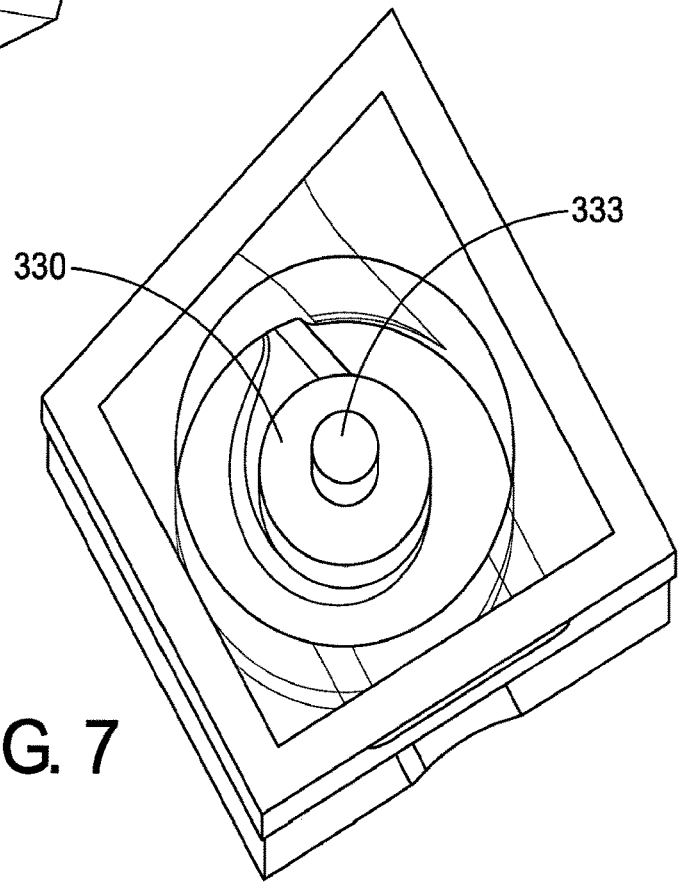
FIG. 7 is a top plan view, partially in phantom, of the charge well of FIG. 6.

Turning next to FIGS. 6 and 7, a solid drum diverter 330 including an attachment post 333 is depicted. Solid, as used in this context, refers to closed top and bottom surfaces with a hollow interior and in the alternative to a body without an open internal volume. Furthermore, the external surface of the diverter is not required to be spherical. For example, a pyramid shape could be employed. Similarly, the sidewalls are not necessarily cylindrical. Rather, an inverted cone shape could be employed. In short, it is envisioned that virtually any shape of diverter can advantageously at least minimally impede the pace at which scrap pieces exit the chamber.

One advantage of the diverter is its ability to be raised and lowered to provide a variable effect on the speed with which molten metal scrap pieces are submerged. Moreover, it is envisioned that the diverter can be located from just above the top edge of the outlet passage 322 wherein the vortex should be significantly impeded or to a level wherein the diverter only slightly penetrates the surface of the molten metal within the chamber (MMS) allowing for a substantially unimpeded vortex to form. Of course, the speed at which metal scrap pieces enter the cavity of the charge well will be higher in the substantially unimpeded state relative to the significantly impeded state. Adjustment of the diverter between these extremes allows the strength of the vortex and the associated ingestion of scrap pieces to be tailored. Similarly, the variable diameter and depth of insertion of the diverter can be used in association with the variability of pump speed to adjust the rate of scrap submergence, scrap residue time in the charge well, and the overall rate of furnace turnover.

It is also envisioned that the diverter can have various diameters ranging from slightly narrower than the diameter of the outlet passage to slightly narrower than the diameter of the chamber. The adjustability of the diverter provides the advantage of tailoring the rate of submergence of scrap pieces deposited on the surface of the charge well. In this manner, an optimal surface residence time can be developed wherein processing fluids are largely evaporated in the charge well but the scrap pieces are submerged before significant metal oxidation occurs.

Figure 8:
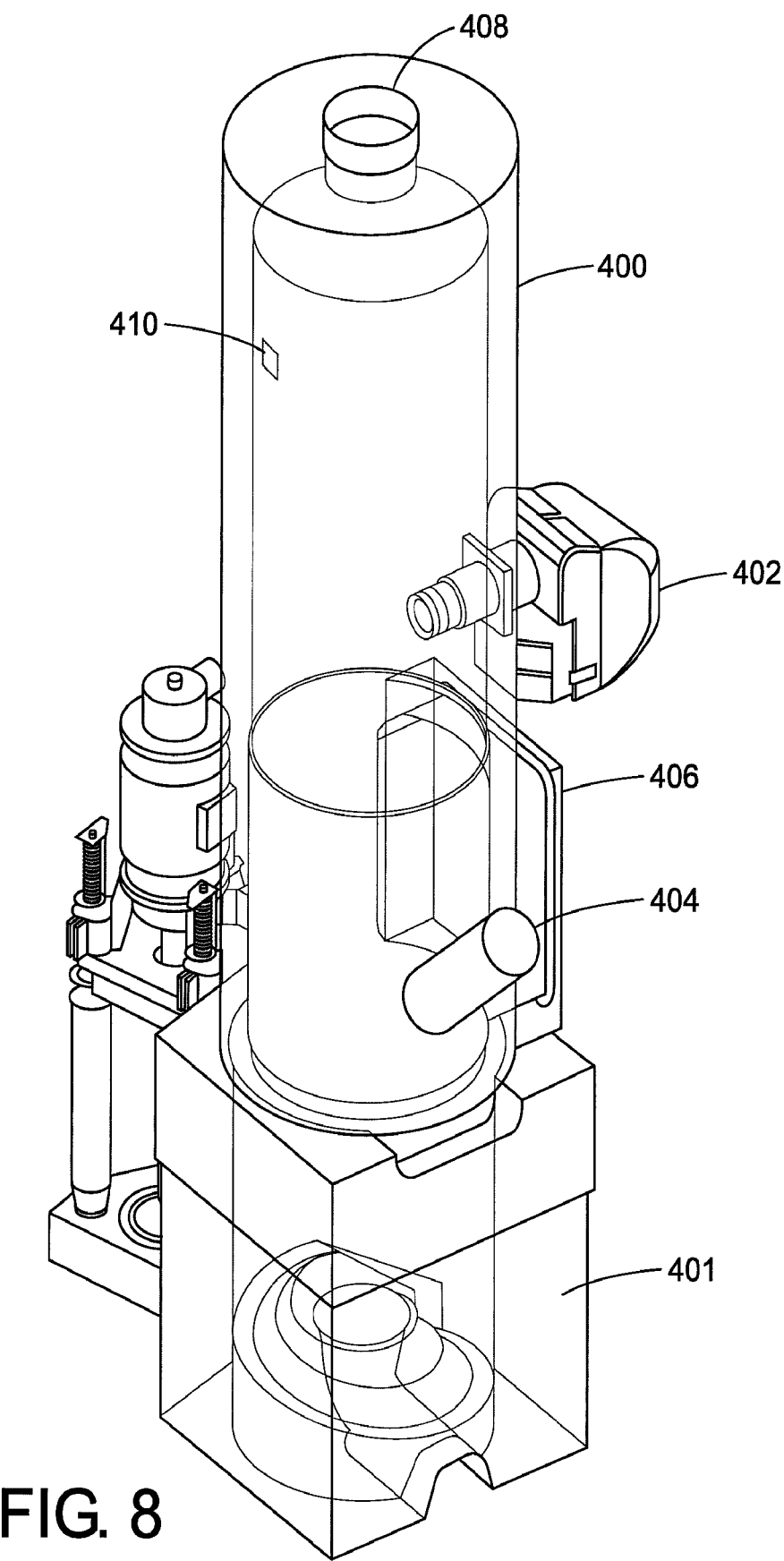
FIG. 8 is a perspective view of the VOC elimination hood of the present disclosure.

Turning now to FIG. 8, a VOC elimination hood 400 overlying charge well 401 is provided. Utilization of the diverter as articulated above provides for the increased evaporation of the VOCs from the surface of the scrap metal pieces. The hood 400 provides containment thereof and elimination thereof. Moreover, the hood 400 includes a burner element 402 suitable for creating a spark or flame within the hood to burn VOCs contained therein. The hood 400 further includes a chute 404 for receiving scrap metal pieces for introduction onto the surface of the molten metal within the charge well 401. A door 406 can also be provided for monitoring the system. Preferably, the hood 400 with be equipped with an exhaust vent 408 for removal of combusted VOCs. The VOC elimination hood can also include a thermocouple 410 measuring a temperature within the hood and automatically activating the burner when the temperature falls below about 1200° F.

It is further noted that while shown in combination with the vortexer type of scrap submergence system, it is anticipated that the hood will have applicability to other scrap submergence systems including vortexing systems without the diverter, rotor based systems, and well walker-type systems. For example, the hood apparatus can be advantageously employed with any scrap submergence device including those described in the following patents and published applications: U.S. Pat. Nos. 4,592,658; 8,246,715; 8,449,814; US 2015/0069679; US 2015/0102536 and US 2015/0323255, the disclosures of which are herein incorporated by reference. In this regard, the VOC elimination hood may advantageously allow the atmosphere inside the hood and scrap submergence chamber to be operated at a reduced oxygen level, resulting in reduced oxidation of scrap metal pieces during melting.

Turning now to an alternative embodiment, a scrap submergence device including a chamber having a diverging truncated cone upper section is described in FIGS. 9-14.

Circulation and scrap melting are two key responsibilities of the present system. Moreover a furnace should be circulated several times (e.g. 4 to 10) an hour to provide a desirable residence time for the molten metal within the furnace. Circulation is accomplished by the molten metal pump. As the skilled artisan recognizes, the speed at which the pump is operated should be varied based on the quantity of molten metal in the system and the desired circulation frequency. For example, a typical pump having a 14 inch diameter impeller needs to operate at about 350 RPM to circulate 2,000,000 lbs. of molten aluminum in an hour. However, the quantity of molten metal in the furnace system can vary based on the ultimate casting plan and the point in time within such casting plan.

The skilled artisan also recognizes that the speed of pump operation impacts the characteristics of the scrap submergence chamber. Moreover, a pump operating at a high speed causes molten metal to rise significantly up the walls of the scrap submergence chamber. A high metal level can be undesirable and can create turbulence leading to dross formation. The present scrap submergence chamber provides a system suitable for operating at both high and low pump speeds. For example, the scrap submergence chamber can be of a size and shape capable of processing a molten metal flow rate ranging from about 750,000 to about 3,000,000 lbs.

More particularly, with reference to FIGS. 9-14, the scrap submergence device includes a charge well 500 having a first diameter portion 502 receiving a ramp insert 504 adjacent an inlet 506. The adjustable vortex inducing ramp insert 504 is depicted in FIGS. 15-18.

A second, larger diameter chamber portion 508 extends above the first diameter chamber portion 502. The second portion 508 can have walls that taper outwardly from an interface with the first portion 502 to a top surface 510 of the device. An overflow channel 512 can be provided in the top surface 510. The second portion as depicted can be generally described as an inverted truncated cone shape. The truncated cone can include walls angling outwardly at an angle of greater than about 15°. In certain embodiments, the second portion has a diameter at least about 20% larger in at least one plane than the first portion.

Although a continuous taper is shown, it is contemplated that one or more vertical portions could be provided in the alternative. Moreover, the second portion could extend upwardly in a step-like fashion.

Molten metal enters the charge well 500 through inlet 506 as forced by a pump (see FIG. 8, for example). Molten metal travels up and around ramp 504 in a vortexing manner and circulates within one or both of chamber portions 502 and 508 depending upon the depth of molten metal in the system and the speed at which the pump is operated. The molten metal receives scrap pieces on its surface which exit the charge well 500 through a passage 514 in the ramp 504 leading to an outlet 516.

Without being based by theory, it is believed that the larger diameter second portion 508 may provide a reduced vortex resulting in a desirable extended residence time for scrap pieces deposited thereon. In addition, the second diameter portion 508 provides a greater available volume to receive molten metal when the associated molten metal pump is operated at a relatively high RPM. Moreover, portion 508 allows molten metal to spread horizontally in a smooth flow.

With reference to FIGS. 15-22, various views of the ramp insert are provided.

Examples

Figure 9:
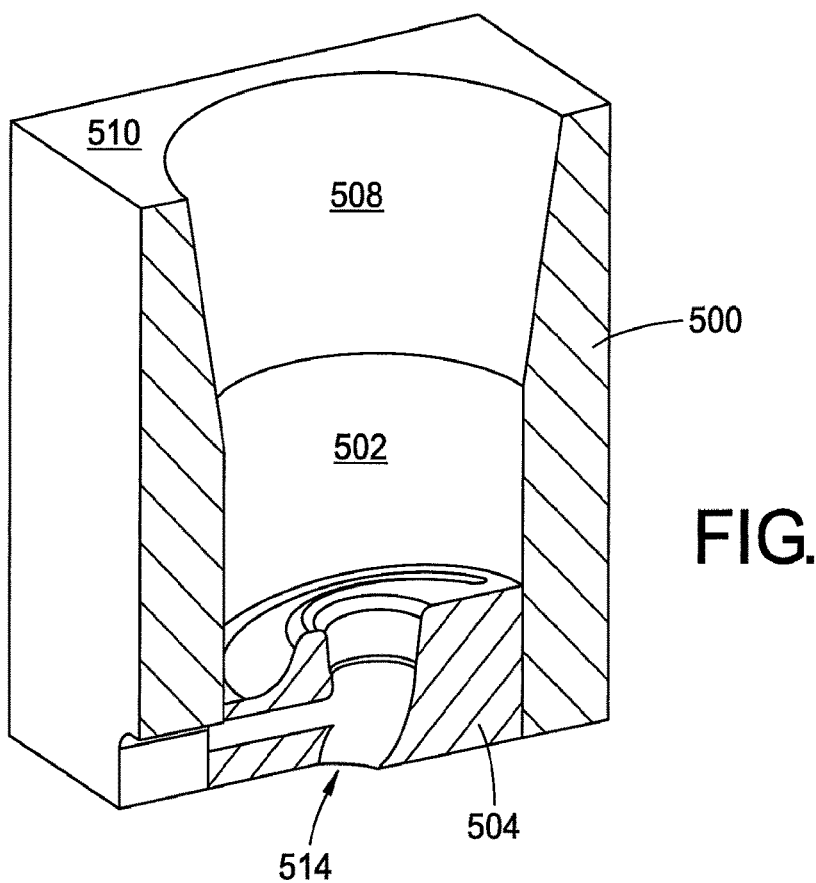
FIG. 9 is a cross-sectional perspective view of an alternate charge well configuration.
Figure 10:
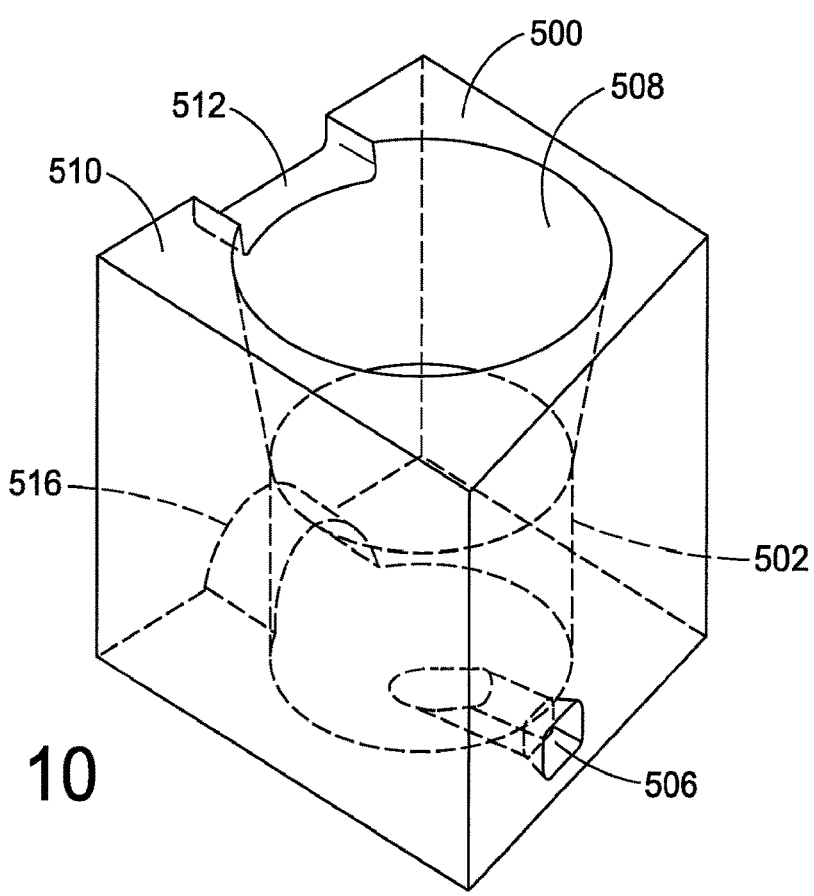
FIG. 10 is a perspective view, partially in phantom, of the charge well of FIG. 9.
Figure 12:
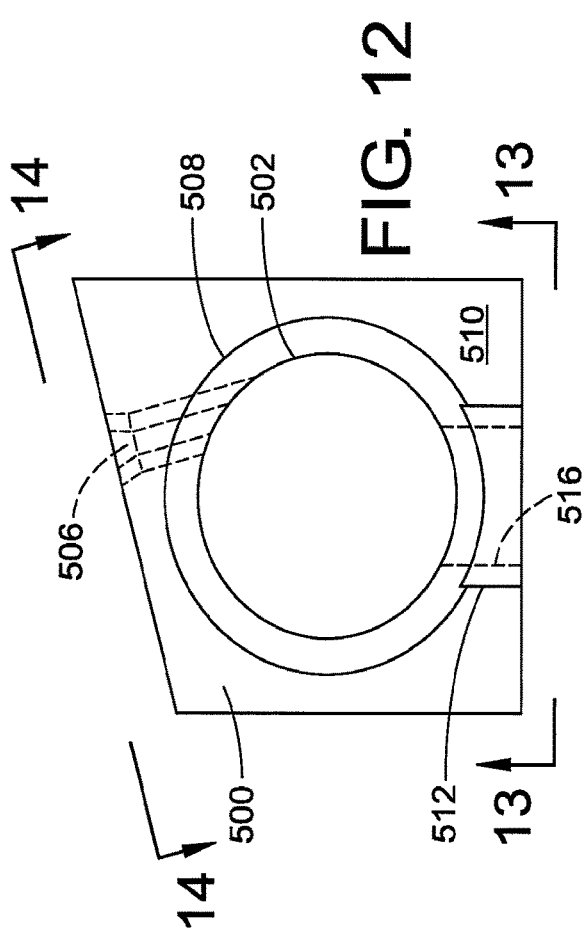
FIG. 12 is a top view, partially in phantom, of the charge well of FIG. 10.
Figure 13:
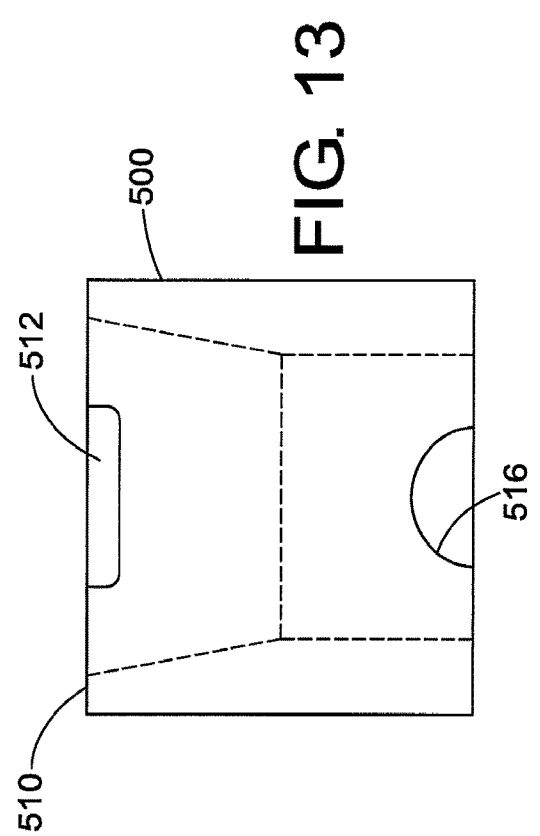
FIG. 13 is a first side view, partially in phantom, of the charge well of FIG. 10.
Figure 11:
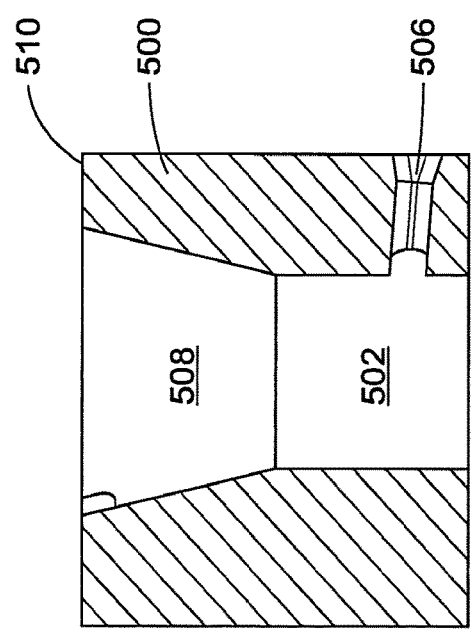
FIG. 11 is a cross-sectional view, partially in phantom, of the charge well of FIG. 10.
Figure 14:
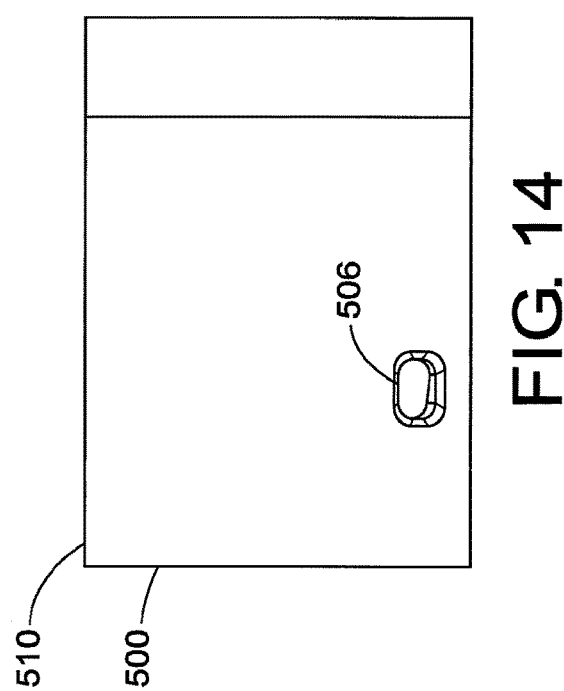
FIG. 14 is a second side view, partially in phantom, of the charge well of FIG. 10.
Figure 15:
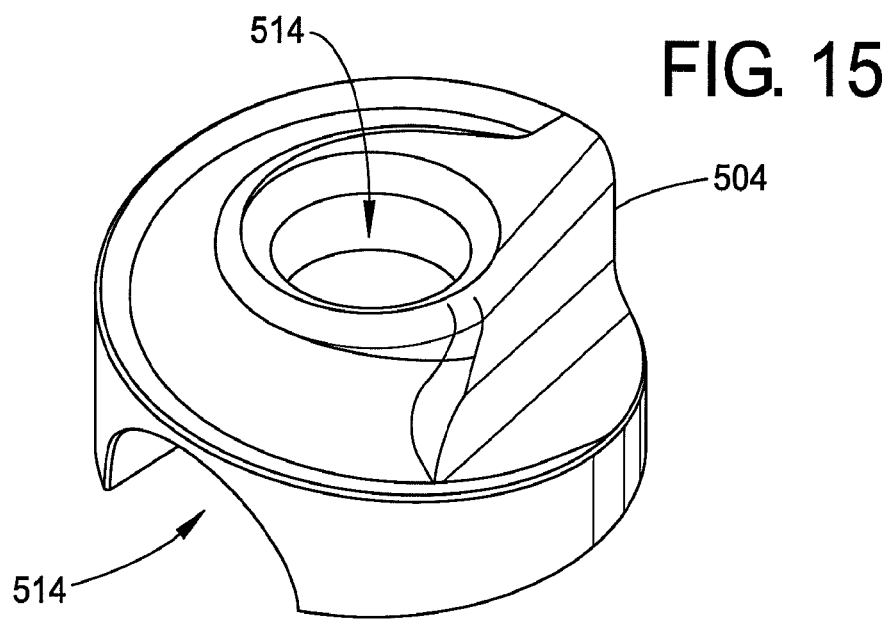
FIG. 15 is a perspective view from above of a ramp insert suitable for use in any embodiment of this disclosure.
Figure 16:
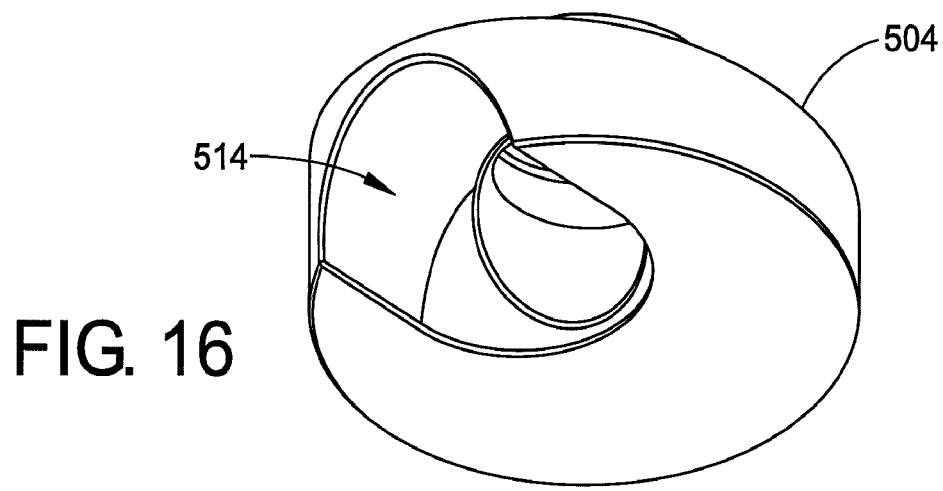
FIG. 16 is a perspective view from below of the ramp insert of FIG. 15.
Figure 17:
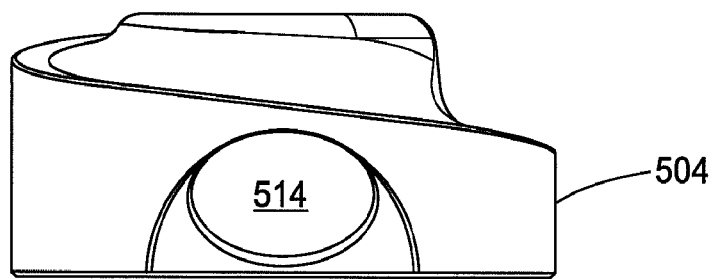
FIG. 17 is a side elevation view of the ramp insert of FIG. 15.
Figure 18:
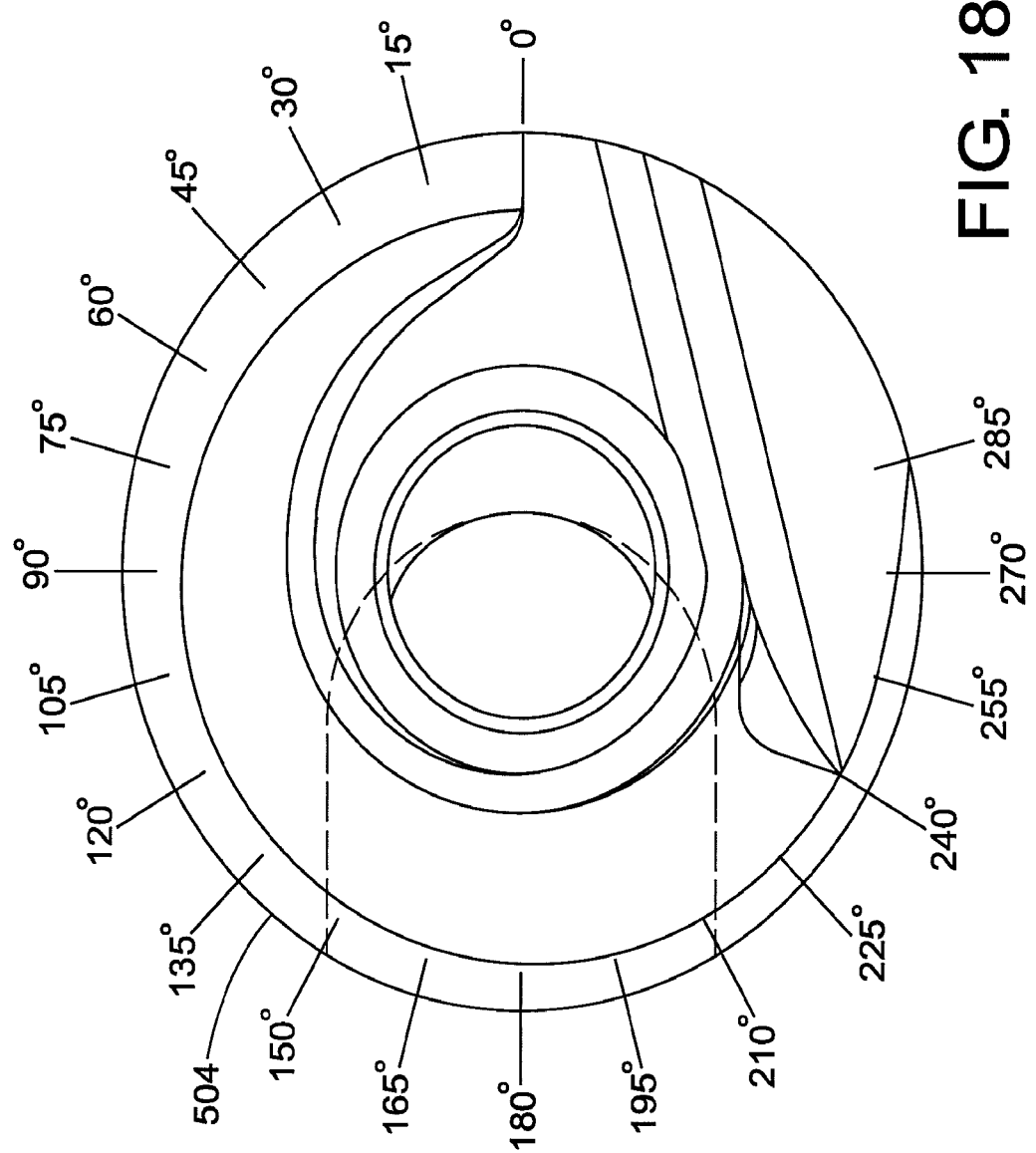
FIG. 18 is a top view of the ramp insert of FIG. 15.

Water modeling tests were performed using a J50SD molten metal pump available from Pyrotek, Inc. in combination with the scrap submergence charge well illustrated in FIG. 9 and the ramp of FIGS. 15-18. The charge well was constructed to include a first diameter portion adjacent the ramp and a second diameter portion extending above the first portion. The first portion had a diameter of 48 inches and the second portion increased in diameter from 48 to 60 inches. Testing was performed at various pump RPM speeds.

The water bath was 14.5" over the top of the base. The pump flow and vortex height above flat bath were recorded. For comparison, a constant 48" diameter charge well was also tested. In these tests, the outlet orifice diameter could be changed. The outlet orifice diameter for 14" was chosen as a representative example.

| STANDARD CHARGE WELL | | | | | |
| --- | --- | --- | --- | --- | --- |
| Speed (rpm) | 250 | 300 | 350 | 400 | 450 |
| Flow (gal/min) | 1345 | 1620 | 1866 | 2150 | 2430 |
| Vortex Height (") | 14 | 19 | 25 | 33 | 37 |

-continued

| TAPERED CHARGE WELL | | | | | |
|---|---|---|---|---|---|
| Speed (rpm) | 250 | 300 | 350 | 400 | 450 |
| Flow (gal/min) | 1424 | 1650 | 1930 | 2240 | 2525 |
| Vortex Height (") | 9 | 14 | 19 | 23 | 28 |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A molten metal scrap submergence system comprising a furnace and a vortexing scrap submergence well, said vortexing scrap submergence well relying on the shape of a chamber of the scrap submergence well to create a molten metal flow which submerges scrap pieces without rotation of a rotor, said vortexing scrap submergence well including a diverter suspended above the well and oriented for immersion in a bath of molten metal circulating within said well, said diverter slowing the egress of scrap from a scrap submergence well outlet, and wherein the vertical position of the diverter is adjustable.

2. The system of claim 1 wherein said diverter is cylindrical.

3. The system of claim 1 wherein said diverter is pyramidal.

4. The system of claim 1 wherein said diverter comprises a disk suspended from a post.

5. The system of claim 2 wherein said diverter comprises a drum.

6. The system of claim 5 wherein said drum includes one or both of an open top end and an open top bottom.

7. The system of claim 1 wherein said diverter has a diameter substantially equal to or larger than a diameter of an exit from said well.

8. The system of claim 1 further including a mechanism for raising and lowering said diverter.

9. The system of claim 1 further comprising a hood element disposed in an overlapping position with said well.

10. The system of claim 1 wherein said scrap submergence well defines a chamber housing a ramp and wherein said chamber has a first diameter adjacent to the ramp and a second greater diameter above the ramp.

11. The system of claim 1 wherein said diverter includes a densifying material cast therein.

12. The system of claim 1 further comprising at least one projection extending from said vortexing scrap submergence well and engaging said diverter to provide stability thereto.

13. The system of claim 9 wherein said hood is a cylinder.

14. The system of claim 13 further comprising a thermocouple measuring a temperature within said hood element and automatically activating a burner when the temperature falls below about 1200° F.

* * * * *